(12) United States Patent
Yamamoto et al.

(10) Patent No.: US 8,997,600 B2
(45) Date of Patent: Apr. 7, 2015

(54) STEERING APPARATUS FOR AN AUTOMOBILE

(75) Inventors: Kou Yamamoto, Gunma (JP); Noritomo Narita, Gunma (JP); Youhei Nakazato, Gunma (JP)

(73) Assignee: NSK Ltd. (JP)

( * ) Notice: Subject to any disclaimer, the term of this patent is extended or adjusted under 35 U.S.C. 154(b) by 344 days.

(21) Appl. No.: 13/574,028

(22) PCT Filed: May 17, 2012

(86) PCT No.: PCT/JP2012/062650
§ 371 (c)(1),
(2), (4) Date: Oct. 8, 2012

(87) PCT Pub. No.: WO2012/157702
PCT Pub. Date: Nov. 22, 2012

(65) Prior Publication Data
US 2013/0199328 A1     Aug. 8, 2013

(30) Foreign Application Priority Data
May 18, 2011    (JP) ................................ 2011-111581

(51) Int. Cl.
*B62D 1/185*     (2006.01)
*B62D 1/16*     (2006.01)
(Continued)

(52) U.S. Cl.
CPC *B62D 1/185* (2013.01); *B62D 1/16* (2013.01); *B62D 5/04* (2013.01); *B62D 1/184* (2013.01); *B62D 1/195* (2013.01)

(58) Field of Classification Search
CPC ............ B62D 1/185; B62D 1/16; B62D 5/04; B62D 1/184; B62D 1/195

USPC .............................. 74/492, 493; 280/775, 777
See application file for complete search history.

(56) References Cited

U.S. PATENT DOCUMENTS 6,244,128 B1 *   6/2001   Spencer et al. .................. 74/493
7,090,250 B2 *   8/2006   Kinoshita et al. ............. 280/775
(Continued)

FOREIGN PATENT DOCUMENTS

| JP | 11-291919 | 10/1999 |
|---|---|---|
| JP | 2000-085596 | 3/2000 |

(Continued)

OTHER PUBLICATIONS

Chinese Office Action; First Notice of Reasons for Rejection; Application No. 201280000342.2.

*Primary Examiner* — David M Fenstermacher
(74) *Attorney, Agent, or Firm* — Hartman Global IP Law; Gary M. Hartman; Domenica N. S. Hartman

(57) ABSTRACT

Construction is achieved wherein the front-end section of an outer column 18a is assembled in the rear-end section of a housing 11a that houses an electric power steering apparatus 10a from below. A block shaped connection and fastening section 36 is provided on the rear-end section of the housing 11a. A pair of slits 37 is formed in portions of the connection and fastening section 36 near the left and right ends, and are open on the bottom end surface and rear end surface of the connection and fastening section 36. At least the front-end section of the outer column 18a has a pair of side plate sections 30 and a bottom plate section 31 that is formed in a U shape that is open at the top. The side plate sections 30 are inserted inside the slits 37 from below. In this state, the connection and fastening section 36 and the front-end section of the outer column 18a are connected and fastened by a bolt 39.

7 Claims, 12 Drawing Sheets

(51) Int. Cl.
*B62D 5/04* (2006.01)
*B62D 1/184* (2006.01)
*B62D 1/19* (2006.01)

(56) References Cited

U.S. PATENT DOCUMENTS

| | | | |
|---|---|---|---|
| 8,123,251 B2 * | 2/2012 | Olgren et al. | 280/777 |
| 8,850,918 B2 * | 10/2014 | Tinnin et al. | 74/493 |
| 2007/0137379 A1 | 6/2007 | Sanji et al. | |
| 2009/0173179 A1 * | 7/2009 | Cymbal et al. | 74/493 |
| 2009/0282945 A1 * | 11/2009 | Streng et al. | 74/493 |
| 2012/0017719 A1 * | 1/2012 | Rouleau et al. | 74/493 |
| 2012/0304796 A1 * | 12/2012 | Tinnin et al. | 74/493 |
| 2013/0298719 A1 * | 11/2013 | Schnitzer et al. | 74/493 |
| 2014/0305251 A1 * | 10/2014 | Wilkes et al. | 74/493 |
| 2014/0331811 A1 * | 11/2014 | Fujiwara et al. | 74/493 |
| 2014/0352480 A1 * | 12/2014 | Butler et al. | 74/493 |

FOREIGN PATENT DOCUMENTS

| | | |
|---|---|---|
| JP | 2001-334945 | 4/2001 |
| JP | 2002-302046 | 10/2002 |
| JP | 2002-3024046 | 10/2002 |
| JP | 2004-034884 | 2/2004 |
| JP | 2008-087583 | 4/2008 |
| JP | 2011-046309 | 10/2011 |

* cited by examiner

STEERING APPARATUS FOR AN AUTOMOBILE

TECHNICAL FIELD

The present invention relates to a steering apparatus for an automobile that is used for applying a steering angle to the steered wheels, and particularly, relates to construction of a connecting section between the front end section of the steering column and the housing of an electric power steering apparatus in a steering apparatus for an automobile that comprises an electric power steering apparatus.

BACKGROUND ART

As illustrated in FIG. 11 and FIG. 12, a steering apparatus for an automobile is constructed, for example, so that rotation of a steering wheel 1 is transmitted to an input shaft 3 of a steering-gear unit 2, and as the input shaft 3 rotates, a pair of left and right tie rods 4 are pushed and pulled so as to apply a steering angle to the front wheels (steered wheels). The steering wheel 1 is supported by and fastened to the rear-end section of a steering shaft 5, and with this steering shaft 5 inserted into a cylindrical shaped steering column 6, the steering shaft 5 is supported by the steering column 6 so as to be able to rotate freely. Moreover, the front-end section of the steering shaft is connected to the rear-end section of an intermediate shaft 8 by way of a universal joint 7, and the front-end section of this intermediate shaft 8 is connected to the input shaft 3 by way of a separate universal joint 9.

The steering apparatus for an automobile that is illustrated in the figures, together with comprising an electric power steering apparatus 10 that assists the operator steer by way of rotation of a motor, also comprises a tilt mechanism for adjusting the up-down position of the steering wheel, and a telescopic mechanism for adjusting the forward-backward position of the steering wheel 1. Therefore, the front-end section of the steering column 6 fits with and fastens to the rear-end section of a housing 11 that houses the component parts of the electric power steering apparatus 10, and this housing 11 is supported by the vehicle body 12 so as to be able to pivot around a horizontal shaft 13 that is arranged in the left-right direction. The steering shaft 5 comprises a combination of an inner shaft 15 and an outer shaft 16 that are capable of transmitting rotation force and are capable of relative displacement in the axial direction, and the steering column 6 comprises a combination of an inner column 17 and an outer column 18 that are capable of relative displacement in the axial direction. Furthermore, the portion near the rear end of the outer column 18 is supported by a vehicle-side bracket 19 that is supported by the vehicle body 19 so that the fastened state of the outer column 18 to the vehicle side bracket 19 can be switched between a fastened state and unfastened state.

In order to achieve this kind of support construction, a pair of holding plate sections 20 of the vehicle-side bracket 19 are arranged at a position on both sides in the left-right direction of the portion near the rear end of the outer column 18 and a column-side bracket 21 that is attached and fastened to the bottom surface of this portion near the rear end. In this state, the inside surfaces of the holding plate sections 20 of the vehicle-side bracket 19 and the outside surfaces of a pair of side plate sections of the column-side bracket 21 come in contact. Arc-shaped long holes 22 in the up-down direction that center around the horizontal shaft 13 are formed at positions in these holding plate sections 20 so as to be aligned with each other. On the other hand, long holes 23 that are long in the forward-backward direction in the axial direction of the outer column 18 are formed at positions in the side plate sections of the column-side bracket 21 so as to be aligned with each other. An adjustment rod 24, which is a rod shaped member, is inserted in the forward-backward long holes 23 and the up-down long holes 22. A head section 25, which is a pressing section, is formed on the base-end section of this adjustment rod 24. An adjustment nut 26, which is also a pressing section, is screwed onto the portion of the tip end section of this adjustment rod 24 that protrudes from the up-down hole 22, and the base-end section of an adjustment lever 27 is connected and fastened to this adjustment nut 26. The adjustment rod 24, the adjustment nut 26 and the adjustment lever 27 constitute an expanding-contracting mechanism for switching between the fastened state and unfastened state between the vehicle-side bracket 19 and the steering column 6.

When adjusting the up-down position and the forward-backward direction of the steering wheel 1, the adjustment lever 27 is operated, and by loosening the adjustment nut 26 the space between the inside surfaces of the holding plate sections 20 is expanded. As a result, the friction force that acts between the holding plate sections 20 and the side plate sections of the column-side bracket 21 is sufficiently decreased, and the fastened state of the outer column 18 to the vehicle-side bracket 19 is released. In this state, when the up-down position of the steering wheel 1 is adjusted, the steering column 6 and steering wheel 1 are pivoted around the horizontal shaft 13 within a range that the adjustment rod 24 can displace inside long hole 22 in the up-down direction. On the other hand, when the forward-backward position of the steering wheel 1 is adjusted, the entire length of the steering column 6 and steering shaft 5 is extended or contracted within the range the adjustment rod 24 can displace inside the long hole in the forward-backward direction. After adjustment, the adjustment lever 27 is operated, and by tightening the adjustment nut 26, the friction force is sufficiently increased, and the column-side bracket 21 and outer column 18 are fastened to the vehicle-side bracket 19. As a result, the steering wheel 1 is held in the adjusted position.

Incidentally, as construction for connecting the front-end section of the steering column 6 and the rear-end section of the housing 11 of this kind of steering apparatus, construction in which the front-end section and the rear-end section fit together in the axial direction is widely used. As an example of this kind of connecting construction, JP2011-46309(A) discloses construction in which the cylindrical shaped front-end section of the steering column is pressed onto and fits around a cylindrical shaped section that is formed on the rear end section of the housing with an interference fit. Moreover, JP2000-85596(A) discloses construction in which the front end section having a partial cylindrical shape of a steering column fits around the cylindrical section that is formed on the rear-end section of a housing, then a fastener fits around this frond end section and by elastically constricting the diameter of the front-end section with this fastener, the inner surface of the front-end section forms a strong friction fit with the outer circumferential surface of the cylindrical section. Furthermore, JP 2008-87583(A) discloses construction in which the cylindrical shaped front-end section of the steering column fits inside a circular hole that is formed on the rear-end section of the housing, and a flange section that is formed around the outer circumferential surface of the portion near the front end of the steering column is connected and fastened to the rear-end surface of the housing with a plurality of bolts.

When using any of the conventional construction as construction for connecting the front-end section of the steering column 6 and the rear-end section of the housing 11, the assembled direction of the steering column 6 with respect to the housing 11 when assembling this connection is in the axial direction of the steering column 6. On the other hand, when assembling the portion near the rear end of the steering column 6 in the vehicle-side bracket 19, this portion near the rear end of the steering column 6 is inserted between the holding plate sections 20 of the vehicle-side bracket 19 from the bottom edge side of these holding plate sections 20. In other words, the assembly direction of the steering column 6 in the vehicle-side bracket 19 is in the radial direction of the steering column 6. In this way, in the case of the conventional construction, the assembly direction of the steering column 6 in the housing 11, and the assembly direction of the steering column 6 in the vehicle-side bracket 19 differ from each other, so in the convention construction, there is a problem from aspect of ease of assembly of the steering apparatus.

RELATED LITERATURE

Patent Literature

[Patent Literature 1] JP2011-46309(A)
[Patent Literature 2] JP2000-85596(A)
[Patent Literature 3] JP2008-87583(A)

SUMMARY OF THE INVENTION

Problem to be Solved by the Invention

Taking the situation above into consideration, it is the object of the present invention to provide construction in a steering apparatus for an automobile of a connecting section between the front-end section of the steering column and the housing of the electric power steering apparatus wherein the assembly direction of the steering column in the housing of the electric steering apparatus and the assembly direction of the steering column in the vehicle-side support bracket coincide with each other.

Means for Solving the Problems

The steering apparatus for an automobile of the present invention has a steering column, a housing that is supported by the vehicle body and that houses an electric power steering apparatus, a vehicle-side bracket that is supported by the vehicle body, and an expansion and contraction mechanism.

The steering column has a front-end section that is formed in a U shape that is open at the top and comprises a pair of left and right side plate sections that face each other and a bottom plate section that connects to the edges on the bottom ends of these side plate sections.

The housing for an electric power steering apparatus has a connection and fastening section on the rear that is provided with a pair of left and right slits that have openings on the bottom end surface and the rear end surface that receive the side plate sections on the front-end section of the steering column.

The vehicle-side bracket has a pair of holding plate sections that are located at positions on both the left and right sides of the middle section of the steering column, with the portion that exists between the bottom edges of the holding plate sections being open.

The expansion and contraction mechanism has a rod shaped member that is inserted in the left-right direction through a through hole that is formed in positions of the holding plate sections that are aligned with each other, and a pair of pressing sections that are provided on both end sections of the rod shaped member. By moving these pressing sections away from each other or close to each other in the axial direction of the rod shape member, the space between the holding plate sections is changed, and when this space is contracted, the expansion and contraction mechanism fastens the steering column to these holding plate sections.

With the side plate sections of the front-end section being inserted into the slits of the connection and fastening section, the front-end section and the connection and fastening section are connected and fastened together by a bolt.

Preferably the side plate sections of the front-end section are pressed into the slits of the connection and fastening section with an interference fit. More specifically, protruding sections are formed on at least one side surface of the slits in the connection and fastening section and the side plate sections of the front-end section, and with the side plate sections of the front-end section being inserted into the slits of the connection and fastening section, the protruding sections come in elastic contact with the opposing surface that faces the one side surface.

Moreover, preferably, a screw hole that is open on the bottom end surface is formed in a position of the connection and fastening section that is between the slits, and a through hole is formed in a position of the bottom plate section of the front-end section that is aligned with the screw hole. With the top surface of the bottom plate section of the front-end section in contact with the bottom end surface of the connection and fastening section, and with a bolt inserted through the through hole in the bottom plate section, the bolt is screwed into the screw hole.

Alternatively, a screw hole is formed so as to pass in the left-right direction through the portion near the top end of the connection and fastening section by way of the slits, and through holes are formed in the side plate sections of the front-end section at positions that are aligned with the screw hole. With the top surface of the bottom plate section of the front-end section in contact with the bottom end surface of the connection and fastening section, and with a bolt inserted through the through holes in the side plate sections, the bolt is screwed into the screw hole.

The present invention can be applied to a steering apparatus that comprises a tilt mechanism for making it possible to adjust the up-down position of the steering wheel that is fastened to the rear-end section of the steering shaft. In this case, the housing is supported by the vehicle body so as to be able to pivotally displace around a horizontal shaft that is arranged in the left-right direction. The through holes in the holding plate sections are long holes in the up-down direction that are arc shaped around the center of the horizontal shaft, a through hole is formed in the middle section of the steering column at a position that is aligned with the long holes in the up-down direction, and the rod member is inserted through the long holes in the up-down direction and the through hole of the steering column. With this construction, when the fastened state of the steering column being fastened to the holding plate sections is released by increasing the space between the holding plate sections by the expansion and contraction mechanism, the up-down position of the steering column can be adjusted within a range that the rod shaped member can displace in the long holes in the up-down direction.

Furthermore, the present invention can be applied to construction that comprises a telescopic mechanism for making it possible to adjust the forward-backward position of the steering wheel. In this case, the steering column comprises a front column that is located the front side, and a rear column that is located on the rear side and assembled so as to be able to displace relative to the front column. The front-end section is formed on the front column. A through hole is formed in the rear section of the front column at a position that is aligned with through holes in the holding plate sections. On the other hand, a long hole in the forward-backward direction that is long in the axial direction of the rear column is formed in the rear column at a position that is aligned with through holes in the holding plate sections and the through hole in the front column. The rod shaped member is inserted through the through holes in the holding plate sections, the through hole in the front column and the long hole in the forward-backward direction of the rear column. In this construction, when the fastened state between the rear column and the holding plate sections and front column is released by enlarging the space between the holding plate sections by the expansion and contraction mechanism, it is possible to adjust the forward-backward position of the rear column within a range that the rod shaped member can displace inside the long hole in the forward-backward direction.

Preferably, the front column is an outer column, and this entire outer column is formed in a U shape that is open at the top with the side plate sections and the bottom plate section. Moreover, the rear column is an inner column and is such that the front section of this inner column fits inside the rear section of the outer column. The expansion and contraction mechanism expands or contracts the inner dimension of the rear section of the outer column by changing the space between the holding plate sections, such that when the inner dimension is contracted, displacement in the axial direction of the inner column with respect to the outer column is suppressed, and when the inner dimension is expanded, displacement in the axial direction of the inner column with respect to the outer column is possible.

Effect of the Invention

With the steering apparatus for an automobile of the present invention, it is possible to make the assembly direction of the steering column in the vehicle-side bracket and the assembly direction of the steering column in the housing for the electric power steering apparatus coincide with each other. Therefore, the work for this assembly can be performed in one process, and thus it is possible to improve the ease of assembly of the steering apparatus.

In other words, when assembling the steering column in the vehicle-side bracket, the middle section of the steering column is inserted between the pair of holding plate sections from the bottom edge side of the holding plate sections. That is, the assembly direction of the steering column in the vehicle-side bracket is in the radial direction of the steering column (direction from the bottom surface toward the top surface). On the other hand, when assembling the steering column in the housing, the portion of the pair of side plate sections of the steering column that correspond to the front-end section of the steering column are inserted into the pair of slits that are formed in the connection and fastening section through openings on the bottom ends of the slits. That is, the assembly direction of the steering column in the housing is also in the radial direction of the steering column (direction from the bottom surface toward the top surface).

MODES FOR CARRYING OUT THE INVENTION

Example 1

Figure 1:
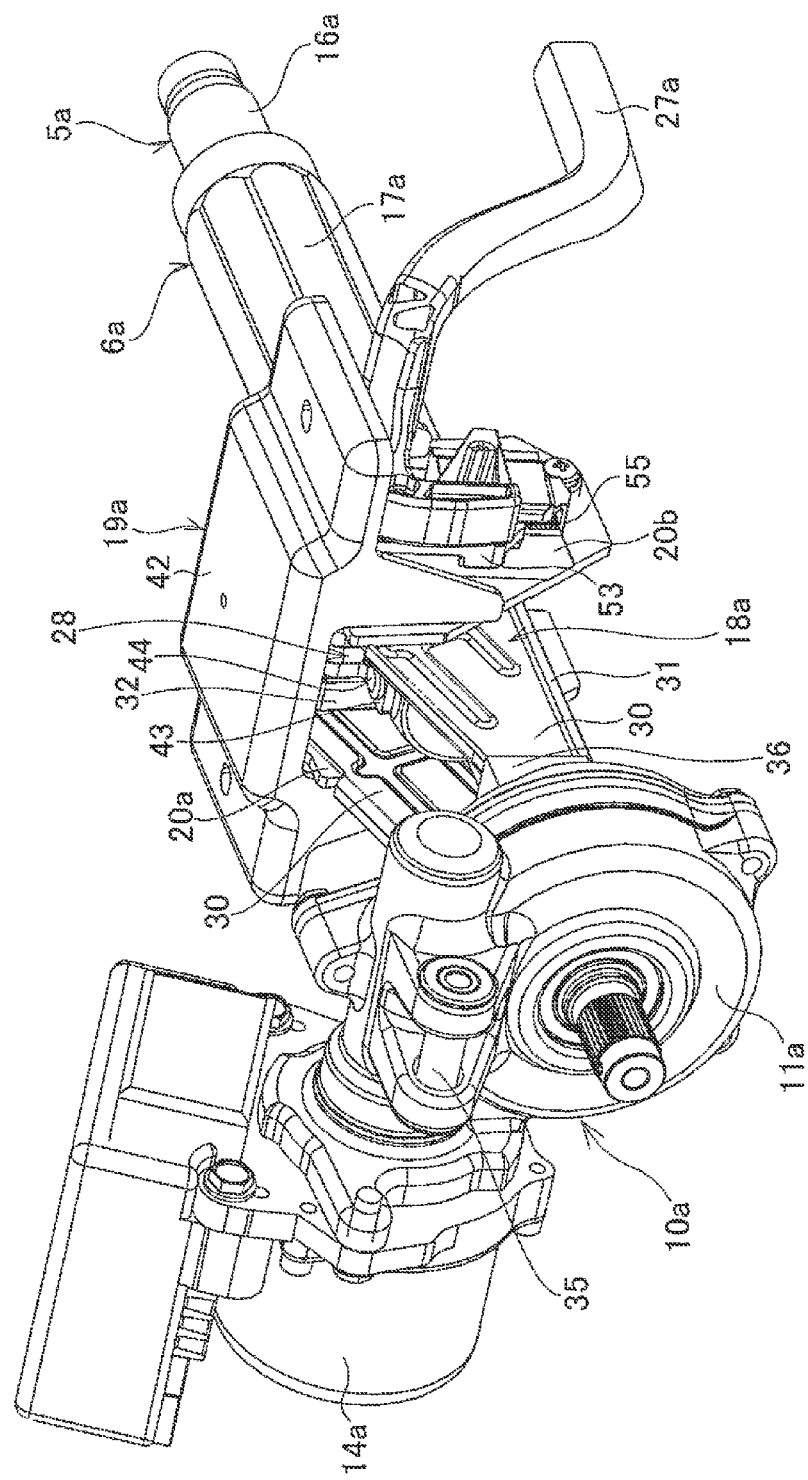
FIG. 1 is a perspective view illustrating a first example of an embodiment of the present invention as seen from the upper front.
Figure 2:
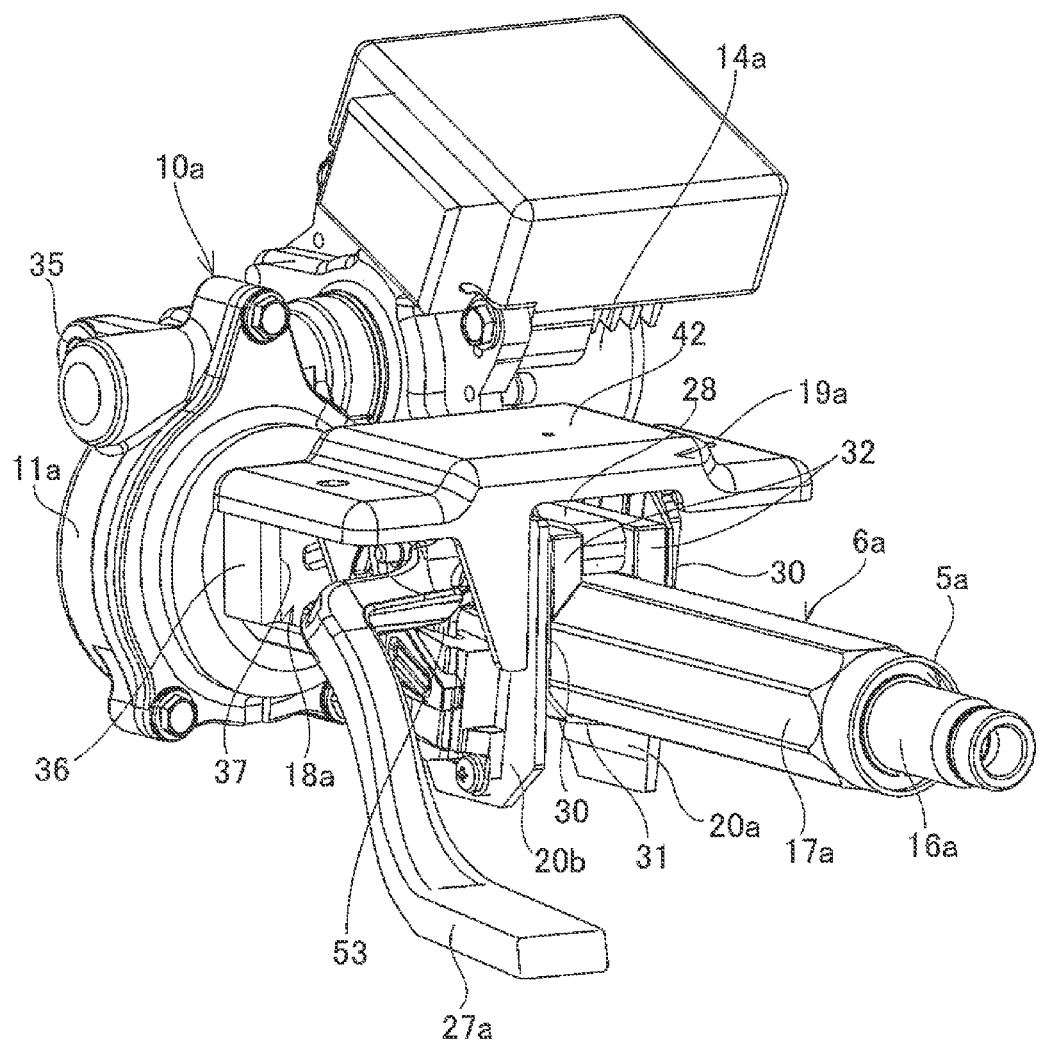
FIG. 2 is a perspective view illustrating the first example as seen from the upper rear.

A first example of an embodiment of the present invention will be explained using FIG. 1 to FIG. 8. The steering apparatus for an automobile of this example comprises a steering column 6a, a steering shaft 5a, a housing 11a for an electric power steering apparatus 10a, a vehicle-side bracket 19a and an expansion and contraction mechanism 29.

In this example, in order to achieve the telescopic mechanism, the steering column 6a comprises an outer column 18a that is a front column, and an inner column 17a that is a rear column, that are combined so as to be capable of relative displacement in the axial direction. The outer column 18a is formed by using a press to perform punching or bending of a metal plate material such as carbon steel plate having sufficient strength and rigidity, and is formed into a U shape that is open at the top comprising a pair of left and right side plate sections 30, the inside surface of which face each other, and a bottom plate section 31 that is connected to the edges on the bottom ends of these side plate sections 30. Moreover, both end sections in the width direction of the bottom plate section 31 are inclined at 45 degrees with respect to both the center section in the width direction of the bottom plate section and the side plate sections 30. The dimension in the up-down direction of the side plate sections 30 (height dimension from the edge sections on both ends of the bottom plate section 31) is comparatively large on the rear-end section and comparatively small on the front-end section, and in the portion between the rear-end section and the front-end section, the dimension changes so as to become smaller going toward the front-end side. The bending rigidity of the side plate sections 30 is maintained by forming a plurality of stiffening beads in both the rear-end section and the middle section of the side plate sections 30, and by forming a flange-like section by bending the top end of the middle section 90 degrees toward the outside in the horizontal direction. Furthermore, restraining blocks 32 are fastened to the portion near the top end of the rear-end section of the inside surfaces of the side plate sections 30 by bolts, welding or the like. The bottom surfaces of these restraining blocks 32 are also inclined 45 degrees with respect to the side plate sections 30 and the center section in the width direction of the bottom plate section 31. The portion that is surrounded by the inside surfaces of the side plate sections 30, the top surface of the bottom plate section 31 and the bottom surface of the restraining blocks 32 is such that the center section in the width direction is open toward the top, and forms nearly an octagonal shaped holding space.

The inner column 17a is formed by performing desired plastic working or milling on the end section of an intermediate material that is integrally formed by extrusion or drawing of a metal material containing a light alloy such as an aluminum alloy, magnesium alloy or the like. The outer perimeter surface of the inner column is an octagonal shape. The front section of this inner column 17a fits inside the rear section of the outer column 18a such that the forward-backward position is adjustable according to displacement in the axial direction. In other words, of the eight flat surfaces of the outer perimeter surface of the inner column 17a, a pair of left and right surfaces that are parallel with each other come in contact with or closely face the inside surfaces of the side plate sections 30, the three flat surfaces in the center and on both the left and right of the bottom side come in contact with or closely face the top surface of the bottom plate section 31, and the two flat surfaces on the left and right of the top side come in contact with or closely face the bottom surfaces of the retaining blocks 32. In construction that does not comprise a telescopic mechanism, the entire steering column can be formed into an arbitrary column shape, and only the front end section is formed into a U shape that is open at the top end by a pair of left and right side plate sections that face each other and a bottom plate section that connects the edges on the bottom ends of the side plate sections.

Moreover, in construction comprising a telescopic mechanism, the steering shaft 5a is such that by combining the rear section of the inner shaft 15a on the front side and the front section of the outer shaft 16 on the rear by a spline fit, the inner shaft 15a and the outer shaft 16a are capable of transmitting rotation force, and are capable of relative displacement in the axial direction. With this construction, the entire length of the steering shaft 5a is able to expand and contract. The steering shaft 5a passes through the inside of the steering column 6a, and the portion near the rear end of the outer shaft 16a is supported by the rear-end section of the inner column 17a by a bearing such as a single-row deep-groove ball bearing that is capable of supporting both radial loads and thrust loads so that steering shaft 5a can rotate freely.

The top surface of the housing 11a for the electric power steering apparatus 10a supports an electric motor 14a, which is the auxiliary driving source. Moreover, the housing 11a houses a plurality of component parts including a reduction gear 34 for transmitting the rotation driving force of the electric motor 14a to the steering shaft 5a. Furthermore, a support tube 35 is provided in the left-right direction at the top end section at the front of the housing 11a. The housing 11a is supported by the vehicle body such that it can pivotally displace around a horizontal shaft such as a bolt that is inserted through the support tube. With this construction, the steering shaft 5a to which the steering wheel is fastened to the rear-end section, and the steering column 6a that supports the steering shaft 5a are able to displace in the up-down direction. Therefore, in construction that does not comprise a tilt mechanism the housing 11a can be supported by and fastened to the vehicle body by rigid construction.

Moreover, the front-end section of the outer column 18a is connected and fastened to the rear-end section of the housing 11a. In this example, a rectangular block shaped connecting and fastening section 36 is provided in the center section of the rear-end surface of the housing 11a. A center hole (not illustrated in the figures) is formed in the center of this connecting and fastening section 36, a pair of slits 37 that are parallel with each other are formed in the portions near the left and right ends of the connecting and fastening section 36, and openings are formed in bottom-end surface and the rear-end surface of the connecting and fastening section 36. The shape of the connecting and fastening section 36 can be another shape such as a semi-circular shape as long as it is possible to form a pair of slits 37 in the portions near the left and right ends.

Figure 6:
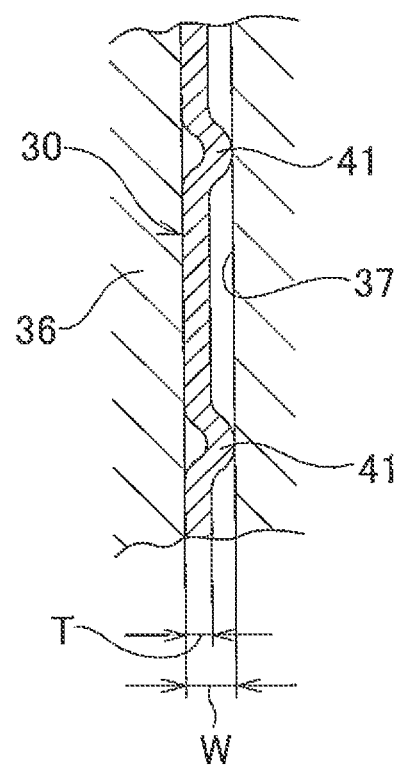
FIG. 6 is an enlarged view of portion C in FIG. 5.

In this example, construction is used in which the front-end section of the side plate sections 30 of the outer column 18a can be pressed into the slits 37 through openings on the bottom ends of these slits 37. In other words, the portion of the connecting and fastening section 36 that is between the slits 37 can be pressed inside the front-end section of the outer column 18a through the opening in the top end of the front-end section. More specifically, the front-end sections of the side plate sections 30 can be pressed inside the slits 37, so construction as illustrated in detail in FIG. 6 is used. That is, the width (W) of the slit 37 is greater than the plate thickness (T) of the side plate section 30 (W>T). In the example in the figure, the width (W) of the slits 37 is double the plate thickness (T) of the side plate sections 30 (W≈2T). Together with this, in the example in the figure, the side surfaces of the side plate sections 30 are such that semi-spherical protrusions 41, which are protruding sections, are formed at a plurality of locations on the side surfaces of the sides of the side plate sections 30 that face each other. With the front-end section of the side plate sections 30 inserted inside the slits 37, the dimensions of each of the parts are regulated so that the tip end sections of the protrusions 41, which are opposing surfaces, come in elastic contact with the inside surfaces of the slits 37. With this construction, the portions of the side plate sections 30 where the protrusions 41 are formed are thicker than the width (W) of the slits 37, and the side plate sections 30 are inserted inside the slits 37 in a state with interference such that there is no movement, so it is possible to increase the rigidity of the connecting section between the connecting and fastening section 36 and the front-end section of the outer column 18a.

Figure 9:
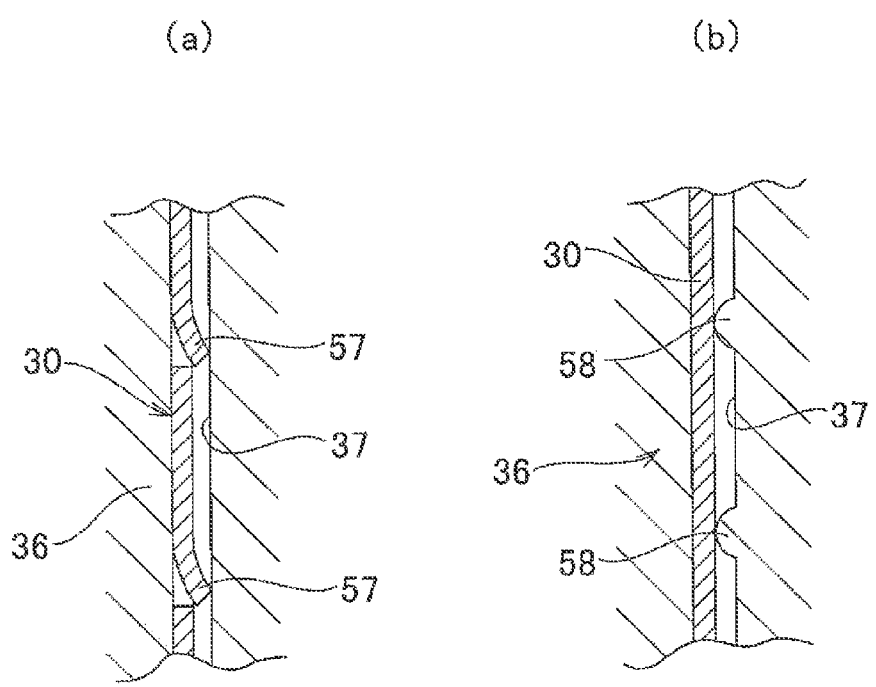
FIGS. 9A and 9B are drawings similar to FIG. 6 and illustrate two examples of the construction of the press fit section for pressing the side plate section into the slit.

In the case of embodying the present invention, it is possible to use bent raised pieces 57 as illustrated in FIG. 9A instead of the semi-spherical protrusions 41 illustrated in FIG. 6 as the protruding sections that are formed on the side surfaces of the front-end section of the side plate sections 30. The bent raised pieces 57 are formed by making U-shaped cuts in part of the side plate sections 30 and bending the portions on the inside of those cuts in a direction protruding from one side surface of the side plate sections 30. By forming the bent raised pieces 57 such that the edges of the tip ends point downward, those edges on the tip ends of the bent raised pieces 57 bite into the inside surfaces of the slits 37 making it difficult for the side plate sections 30 to come out from the bottom of the slits 37, so it is possible to simplify the assembly work. Alternatively, it is also possible to use protruding ridges that are long in the forward-backward direction or up-down direction as the protruding sections. Moreover, it is possible to form protruding sections on the inside surfaces of the slits 37. FIG. 9B illustrates an example of forming ridges 58 that are long in the forward-backward direction (front-rear direction in FIG. 9B) at a plurality of locations on the inside surfaces of the slits 37 separated in the up-down direction. Furthermore, the protruding sections can be formed on both the side surfaces of the side plate sections 30 and the inside surfaces of the slits 37. In this case, by staggering the phase in the forward-backward direction of these protruding sections, interference between these protruding sections can be avoided when inserting the side plate sections 30 inside the slits 37. Furthermore, protruding sections can be formed by bending the shape of the side plate sections 30 so that the tip end sections are bent in the direction toward each other, or by fastening synthetic resin protrusions to the side surfaces of the side plate sections 30, thus enabling the front-end sections of the side plate sections 30 to be pressure fitted inside the slits 37.

Moreover, in the case of embodying the present invention, instead of using the construction of press fitting of the side plate sections 30 into the slits 37 as the construction for preventing movement of the sliding plate sections 30 that are inserted into the slits 37, it is also possible to use construction of restraining the side plate sections 30 by the inside surfaces of the slits 37 wherein screw members such as hollow set screws (hexagon socket head set screws) are screwed into screw holes that are formed in both the left and right end sections of the connecting and fastening member 37 (portions further on the outside in the width direction than the slits 37), or pins that are pressed into through holes that are formed in both the left and right end sections of the connecting and fastening section 36.

With the front-end sections of the side plate sections 30 inserted inside the slits 37, the center section in the width direction of the top surface of the front-end section of the bottom plate section 31 of the outer column 18*a* is brought into contact with the center section in the width direction of the bottom surface of the portion of the connecting and fastening section 36 that is between the slits 37. In this state, a fastening bolt 39 that is inserted through a though hole 38 that is formed in the center section in the width direction of the front-end section of the bottom plate section 31 is screwed into a screw hole 40 that is formed in the center section in the width direction of the bottom surface of the connecting and fastening section 36 and that is open on the bottom end surface, and by tightening the bolt, the connecting and fastening section 36 is connected and fastened to the front-end section of the outer column 18*a*. In this example, the assembly direction of the fastening bolt 39 and the assembly direction of the steering column 6*a* to the vehicle-side support bracket 19*a* are the same, and are in the radial direction of the steering column 6*a* (direction from the bottom surface toward the top surface). Therefore, at the same time that the connecting bold 39 is screwed into the screw hole 40 of the connecting and fastening section 36, the front-end sections of the side plate sections 30 of the outer column 18*a* can be pressure fitted inside the slits 37, and thus the ease of assembly of the steering apparatus can be improved.

Figure 3:
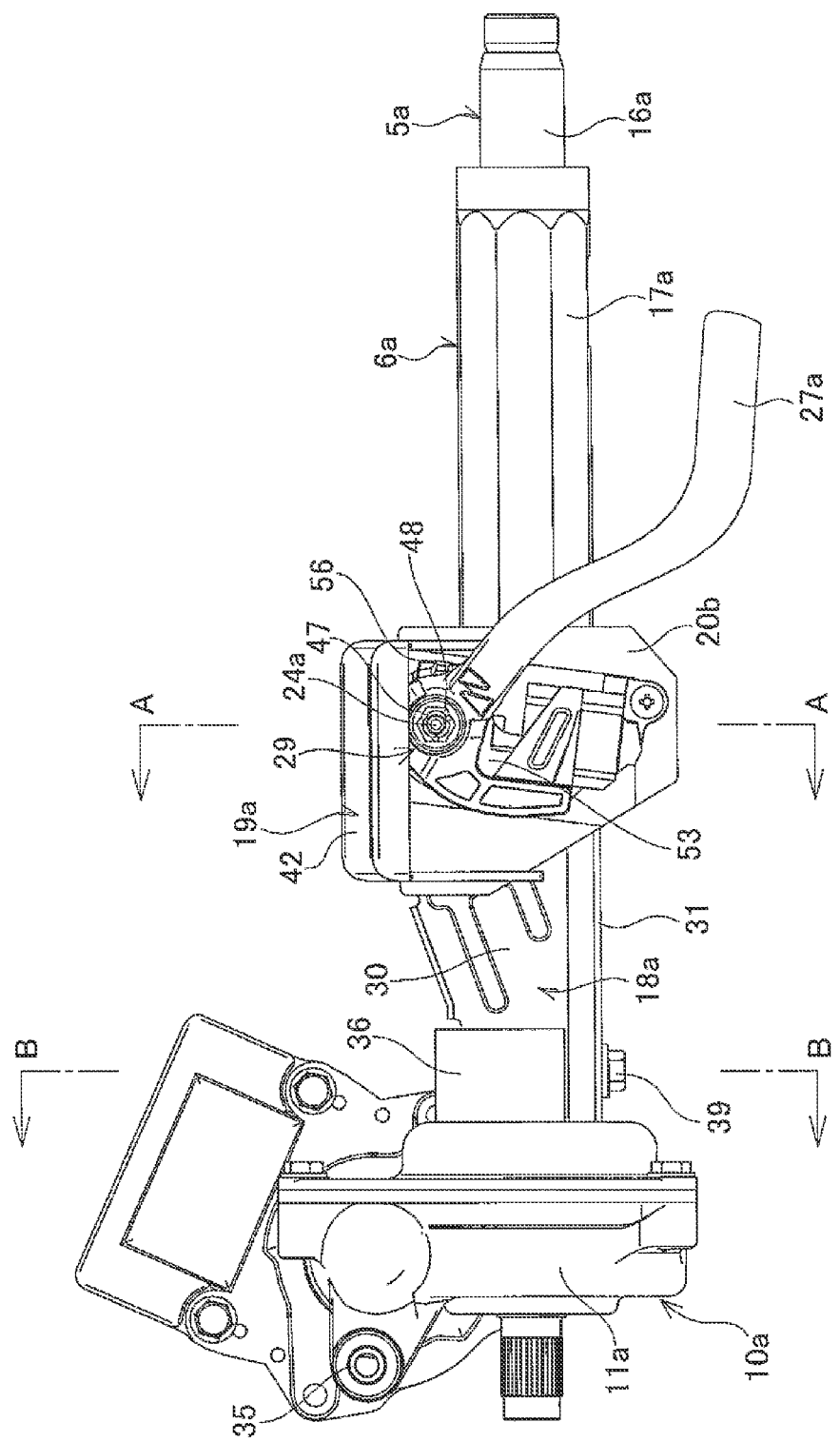
FIG. 3 is a side view of the first example.
Figure 11:
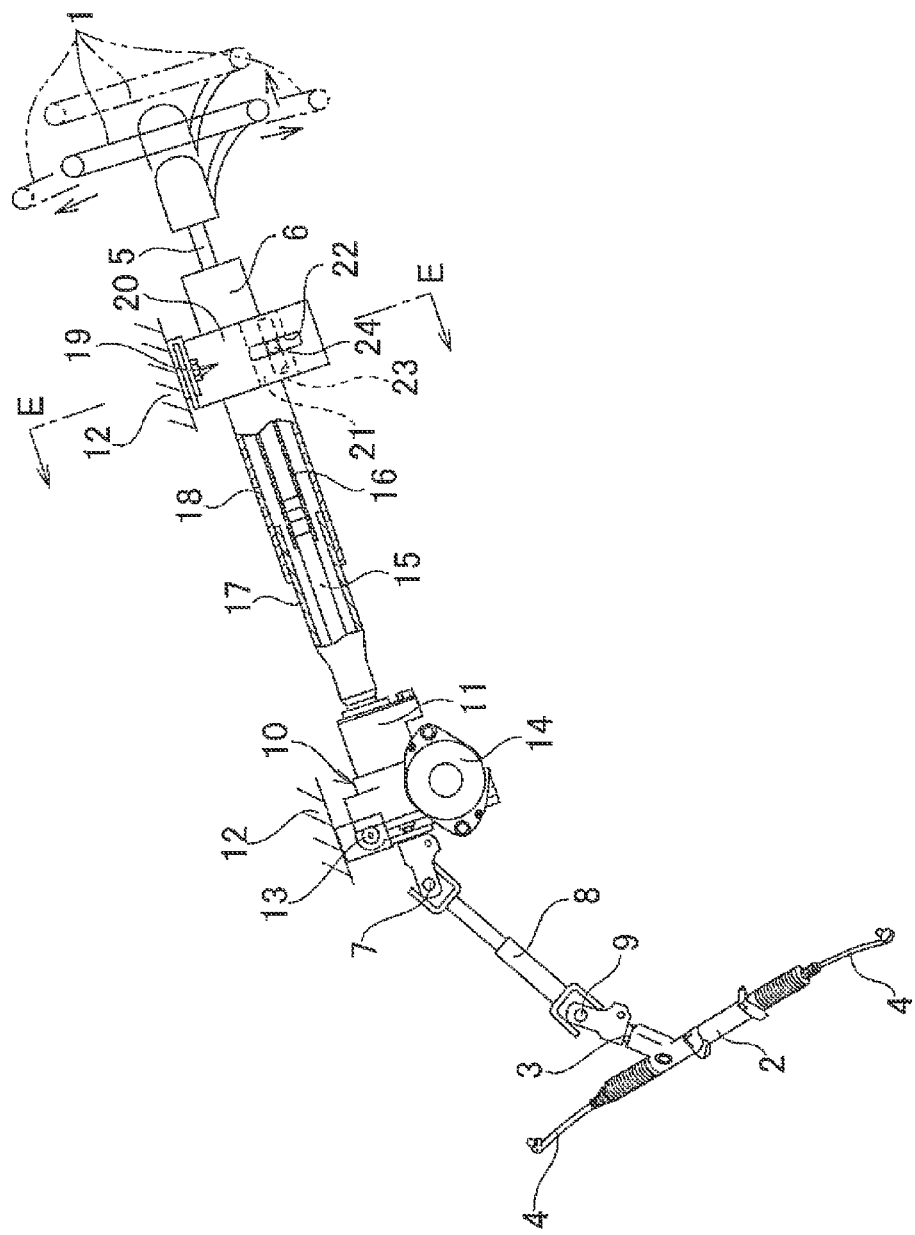
FIG. 11 is a partial cross-sectional view illustrating an example of a conventionally known steering apparatus.
Figure 12:
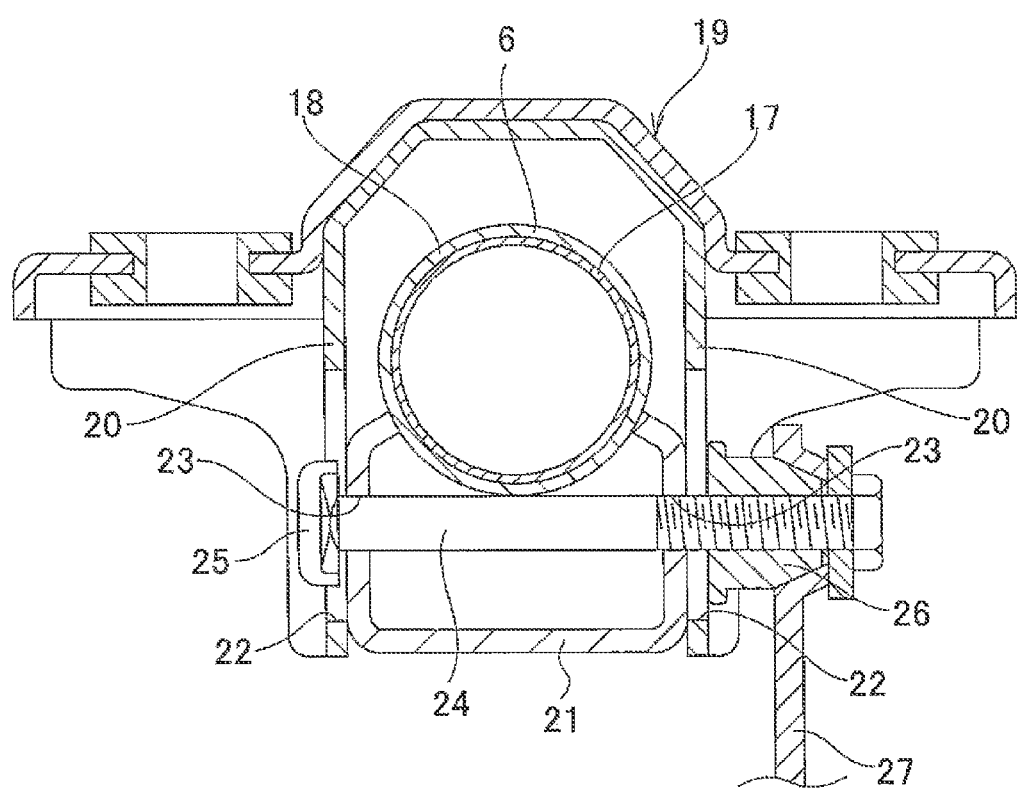
FIG. 12 is a cross-sectional view of section E-E in FIG. 11, with part removed.

By connecting and fastening the connecting and fastening section 36 and the outer column 18*a* in this way, the front-end sections of the side plate sections 30 of the outer column 18*a* are prevented from coming out of the slits 37 even when the body of the operator collides with the steering wheel 1 (see FIG. 11) during a secondary collision, and the entire steering apparatus rotates around the expansion and contraction mechanism 29 such that the front side rotates downward and the rear side rotates upward (counterclockwise direction in FIG. 3). The front-end section of the inner shaft 15*a* is inserted inside the housing 11*a* through a center hole (not illustrated in the figure) in the connecting and fastening section 36, and connects with the component parts of the electric power steering apparatus 11*a* that is housed inside the housing 11*a*.

The vehicle-side bracket 19*a* comprises a top plate section 42 and a pair of holding plate sections 20*a*, 20*b*. The top plate section 42 and holding plate sections 20*a*, 20*b* are formed by using a press to perform punching and bending of a metal plate such as steel plate having sufficient strength and rigidity, and connected and fastened together to form a single piece by welding or the like. Installation holes, through which bolts or studs are passed in order to support the top plate section 42 and fasten the top plate section 42 to the vehicle body, are formed in the top plate section 42. Moreover, holding plate sections 20*a*, 20*b* are placed at positions on both sides in the left-right direction of the rear-end section of the outer column 18*a*. Long holes 22*a*, 22*b* that are long in the up-down direction are formed at positions in the top portions of the holding plate sections 20*a*, 20*b* that are aligned with each other. The long holes 22*a*, 22*b* in the up-down direction are arc shaped around the center axis of the support tube 35.

In this example, an energy-absorbing member 28, which is a member of the inner column 17*a*, is fastened to the top surface of the front-end section of the inner column 17*a*. This energy-absorbing member is formed by bending a metal plate, such as mild steel plate that is capable of plastic deformation, into a long rectangular frame shape that is long in the forward-backward direction, and an installation plate section 43 protrudes forward from the bottom-end section of the front-end surface. Installation members 44 such as rivets or screws that are inserted through holes that are formed in this installation plate section 43 fasten the energy-absorbing member 28 to the inner column 17*a*. This energy-absorbing member 28 expands due to plastic deformation that occurs during a secondary collision that accompanies a collision accident, and allows the inner column 17*a* to displace in the forward direction together with the steering wheel. As a result, it is possible to protect the operator by absorbing energy that is transmitted from the body of the operator to the inner column 17*a* by way of the steering wheel during a secondary collision.

Moreover, the expansion and contraction mechanism 29 is form expanding or contracting the space between the inside surfaces of the holding plate sections 20*a*, 20*b*, and comprises an adjustment rod 24*a*, which is a rod shaped member, an adjustment lever 27*a*, and a cam device 45. Of these, the adjustment rod 24*a* is inserted in the left-right direction through the long holes 22*a*, 22*b* in the up-down direction, through holes 46 that are formed in the side plate sections 30 and restraining blocs 32 of the outer column 18*a*, and long hole 23*a* in the forward-backward direction that is long in the axial direction of the inner column 17*a* and formed in the inside of the energy-absorbing member that is attached to the inner column 17*a*. Moreover, the rod section 24*a* is such that a head section 25*a* is formed on the base end section (right end section in FIG. 4 and FIG. 8), and a convex section that is formed on the inside surface of this head section 25*a* fits inside one of the long holes 22*a* in the up-down direction that is formed on one of the holding plate section 20*a* of the holding plate sections 20*a*, 20*b* (right holding plate section in FIG. 4 and FIG. 8) so as to be able to displace (move up or down) only along this long hole 22*a* in the up-down direction. Furthermore, the adjustment lever 27*a* is such that the base end section is supported by the tip end section (left end section of FIG. 4 and FIG. 8) of the adjustment rod 24*a* by way of a thrust sliding bearing 47 and nut 48 so that that adjustment lever 27*a* can rotate with respect to the adjustment rod 24*a*, and is prevented from displacement in the removal direction from the tip end section of the adjustment rod 24*a*. The long hole 23*a* in the forward-backward direction, instead of the energy-absorbing member, can also be formed in the inner column 17*a* itself, or can be formed in a separate member that is attached to the inner column 17*a*.

Figure 4:
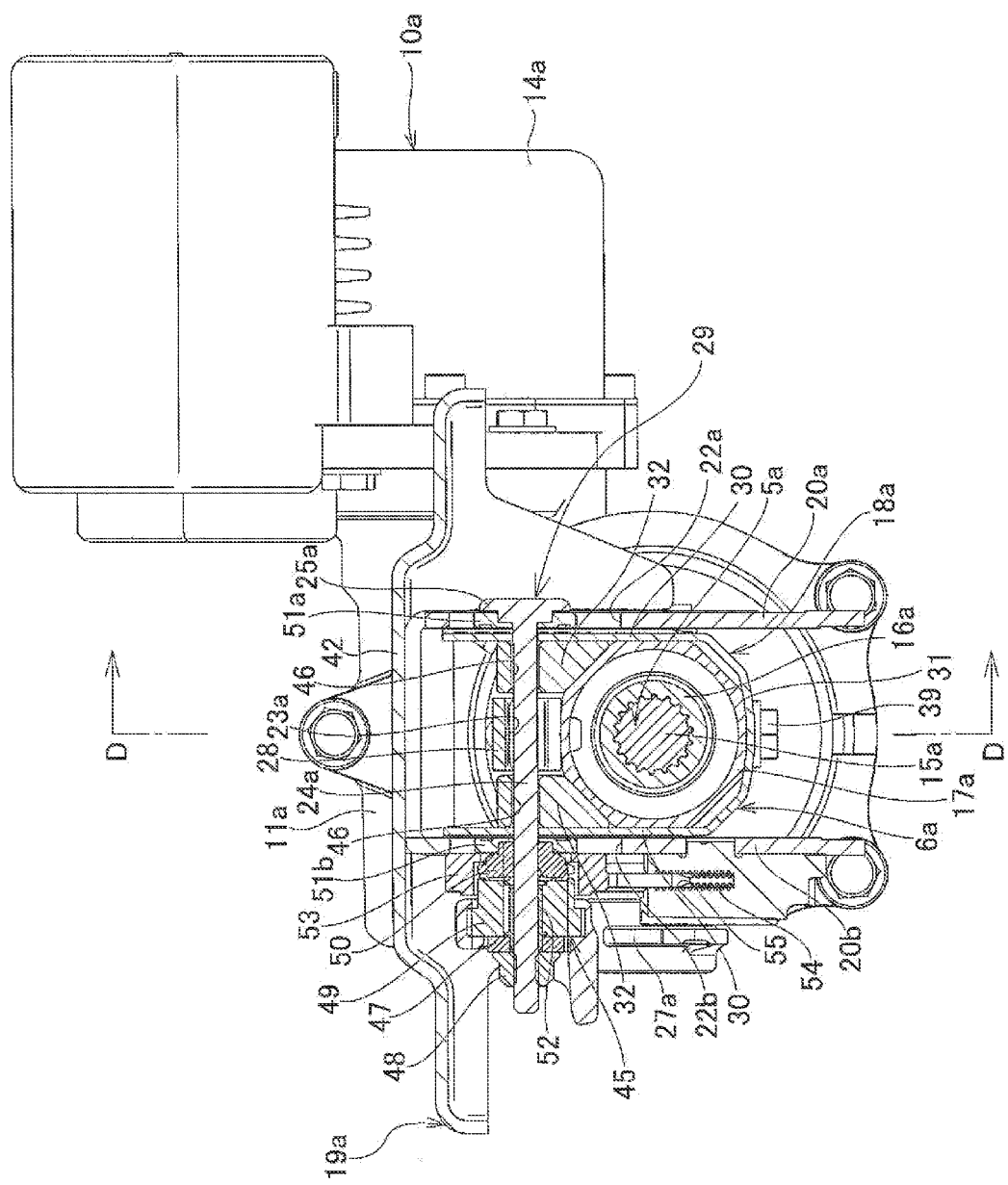
FIG. 4 is a cross-sectional view of section A-A in FIG. 3.
Figure 5:
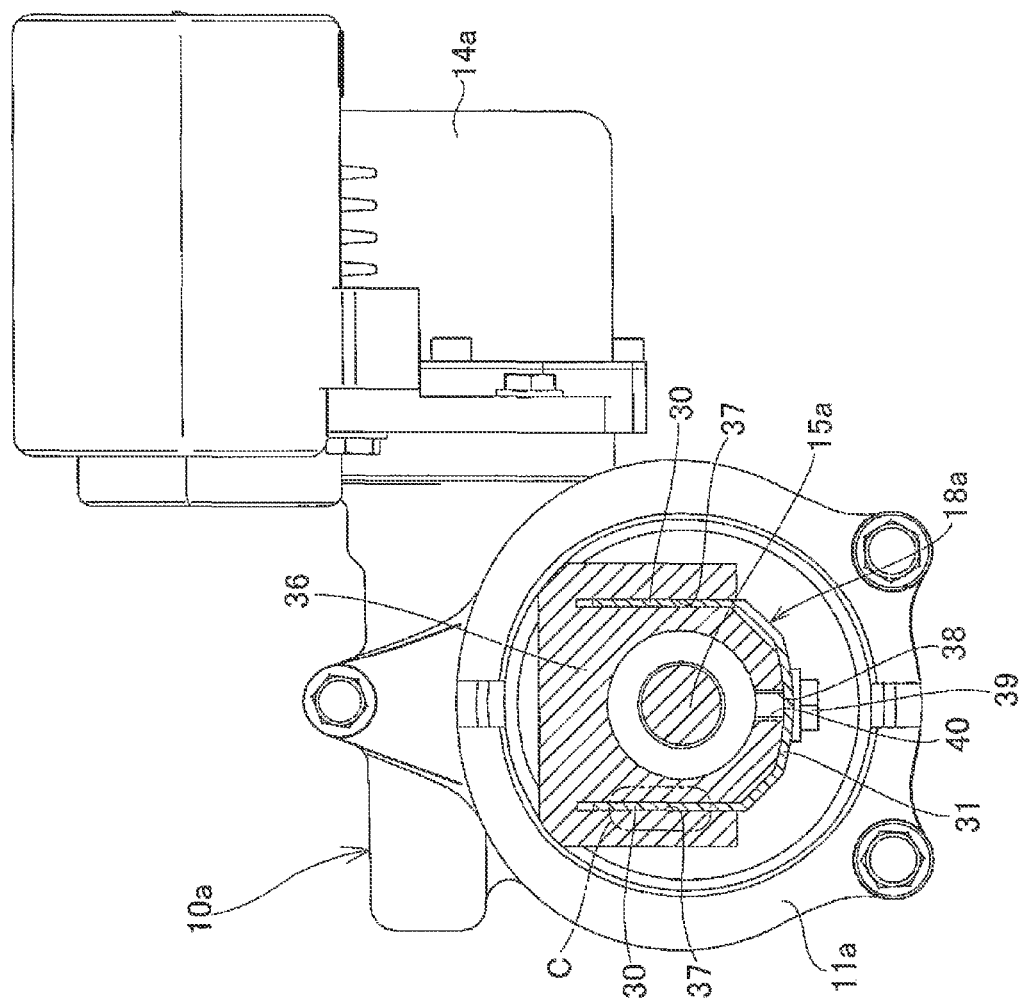
FIG. 5 is a cross-sectional view of section B-B in FIG. 3.
Figure 8:
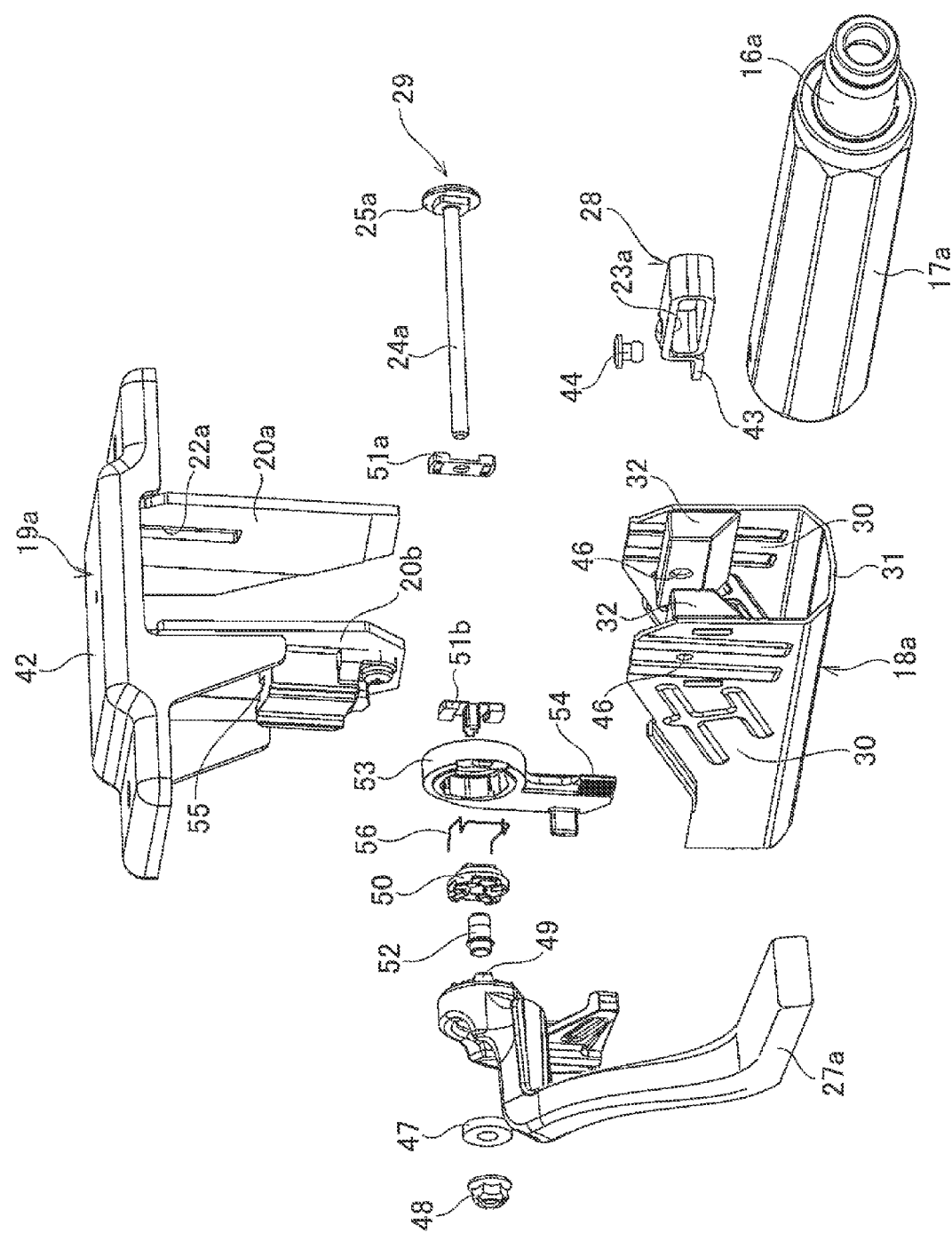
FIG. 8 is an exploded perspective view illustrating the mechanism for adjusting the forward-backward position and the up-down position of the inner column as seen from the upper rear.

The cam device 45 is provided between the inside surface on the base end section of the adjustment lever 27*a* and the outside surface of the other holding plate section 20*b* of the holding plate sections 20*a*, 20*b* (left holding plate section in FIG. 4 and FIG. 8). The cam device 45 comprises a driving cam 49 that is supported by the inside surface of the base end section of the adjustment lever 27a and that rotates together with the adjustment lever, and a driven cam 50 that fits in the other long hole 22b in the up-down direction that is formed in the other holding plate section 20b so as to be able to move only up or down. Cam surfaces are formed on the surfaces of the driven cam 50 and the driving cam 49 that face each other, and due to relative rotation between the driven cam 50 and driving cam 49, the dimension in the axial direction of the cam device 45 expands or contracts. In this example, the head section 25a and the driven cam 50 form a pair of pressing sections. Spacers 51a, 51b, which are formed using a material such as synthetic resin that slides easily, are placed over positions in the middle section of the adjustment rod 24a that are located on the inside of the long holes 22a, 22b in the up-down direction, making it possible for the adjustment rod 24a to smoothly displace along the long holes 22a, 22b in the up-down direction. Moreover, the spacer 51b that fits in the other long hole 22b in the up-down direction, by engaging with the driven cam 50, prevent rotation of the driven cam 50. Furthermore, a cylindrical radial sliding bearing 52 that is made using a material that slides easily is located between the inner circumferential surface of the driving cam 49 and the outer circumferential surface of the adjustment rod 24a.

In the case of the steering apparatus of this example, when adjusting the up-down position or the forward-backward position of the steering wheel (not illustrated in the figure) that is fastened to the rear-end section of the steering shaft 5a, the dimension in the axial direction of the cam device 45 is shortened by rotating the adjustment lever 27a in the downward direction. As a result, the space between the inside surfaces of the holding plate sections 20a, 20b is expanded and the surface pressure at the area of contact between the inside surfaces of these holding plate sections 20a, 20b and the outside surfaces of the side plate sections 30 of the outer column 18a is sufficiently reduced. Together with this, the space between the side plate sections 30 and the restraining blocks 32 is expanded, and the surface pressure at the area of contact between the outer circumferential surface of the inner column 17 and inner circumferential surface of the outer column 18a is sufficiently reduced. As a result, the state of the outer column 18a and inner column 17a being fastened to the vehicle-side bracket 19a is released. When the up-down position of the steering wheel is adjusted in this state, the steering column 6a and the steering shaft 5a are pivoted around the support tube 35 within the range that the adjustment rod can displace inside the long holes 22a, 22b in the up-down direction. On the other hand, when adjusting the forward-backward direction of the steering wheel, the entire length of the steering column 6a and the steering shaft 5a is extended or contracted within the range that the adjustment rod 24a can displace in the long hole 23a in the forward-backward direction. After adjustment, by rotating the adjustment lever 27a in the upward direction, the dimension in the axial direction of the cam device 45 is expanded. As a result, due to an operation that is opposite that when releasing the fastened state above, the surface pressure at the areas of contact is sufficiently increased. Consequently, the steering wheel is maintained at the adjusted position.

Moreover, in this example, construction is provided for increasing the support strength for supporting the steering wheel in the adjusted up-down position. In other words, the base section of a pivot arm 53 is fitted over the portion of the adjustment rod 24a near the tip end of the middle section so as to be able to pivot and displace. Moreover, a male gear 54 is provided on the tip end section of the pivot arm 53 and a female gear 55 is provided on part of the outside surface of the holding plate section 20b, and as the pivot arm 53 pivots, the male gear 54 and female gear 55 can be placed in either the engaged state or released state. As the adjustment lever 27a is rotated in a direction for adjusting the position of the steering wheel, the pivot arm 53 is pivoted in a direction that releases the engagement between the male gear 54 and the female gear 55. When the male gear 54 and the female gear 55 are in the engaged state, the adjustment rod 24a is connected with the holding plate section 20b by way of the pivot arm 53, so regardless of whether there is a large impact load during a secondary collision, the up-down position of the steering wheel does not move a large amount.

The driven cam 50 is assembled to the base section of the pivot arm 53 so as to be able to rotate relative to the pivot arm 53 as well as to be able to displace a little in the up-down direction with respect to the pivot arm 53. The driven cam 50, as described above, is such that relative rotation with respect to the holding plate section 20b is prevented. Moreover, a restoring spring 56 is provided between the driven cam 50 and the pivot arm 53, and supports the driven cam 50 with respect to the pivot arm 53 so as to be able move up or down a little about the neutral position. The reason for allowing this small amount of up or down movement is that, even though the up-down position of the steering wheel can be adjusted in a smooth non-step manner, the engagement position between the male gear 54 and female gear 55 is in steps, so this small amount of up or down movement absorbs that difference.

With the steering apparatus of this example, it is possible to make the assembly direction of the steering column 6a in the vehicle-side bracket 19a coincide with the assembly direction of the steering column 6a in the housing 11a. In other words, when assembling the steering column 6a into the vehicle-side bracket 19a, the middle portion of the steering column 6a (rear-end section of the outer column 18a) is inserted between the pair of holding plate sections 20a, 20b of the vehicle-side bracket 19a from the bottom end edge side of these holding plate sections 20a, 20b. That is, the assembly direction of the steering column 6a with respect to the vehicle-side bracket 19a is in the radial direction of the steering column 6a (direction from the bottom surface toward the top surface). On the other hand, when assembling the steering column 6a into the housing 11a, the front-end sections of the part of side plate sections 30 of the outer column 18a are inserted into the pair of slits 37, which are formed in a connection and fastening section 36 that is provided on the rear-end section of the housing 11a, by way of openings on the bottom ends of these slits 37. That is, the assembly direction of the steering column 6a with respect to the housing 11a can also be in the radial direction of the steering column 6a (direction from the bottom surface toward the top surface).

Figure 7:
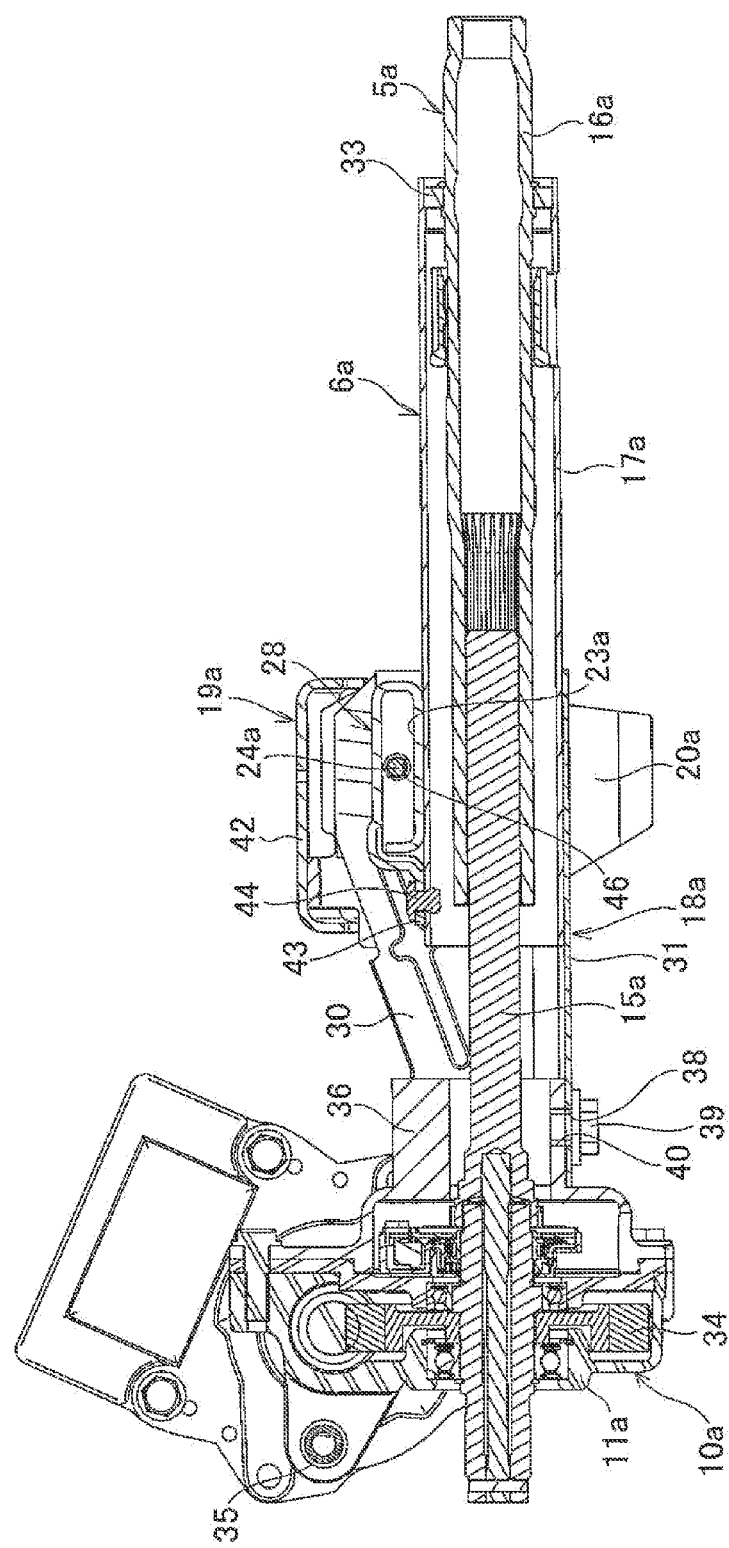
FIG. 7 is a cross-sectional view of section D-D in FIG. 4.

Therefore, when assembling the steering apparatus of this example, the housing 11a and the vehicle-side bracket 19a are set in a tool with the positional relationship illustrated in FIG. 7, and in this state, the front-end section and the middle section of the steering column 6a can be assembled into the connection and fastening section 36 of the housing 11a and the pair of holding plate sections 20a, 20b of the vehicle-side bracket 19a in the radial direction of the steering column 6a from the bottom in FIG. 7. Therefore, assembling the steering column 6a in the vehicle-side support bracket 19a and assembling the steering column 6a in the housing 11a can be performed in one process, and thus it is possible to improve the ease of assembly of the steering apparatus by that amount. The actual work is performed in a positional relationship that is upside down from the positional relationship illustrated in FIG. 7.

The work of inserting the front-end section of the steering column 6a (front-end sections of the side plate sections 30) into the slits 37, and the work of inserting the middle section of the steering column 6a into the portion between the holding plate sections 20a, 20b can be performed in order as described below. First, the housing 11a and the vehicle-side support bracket 19a are set in a too with the positional relationship illustrated in FIG. 7, then only the housing 11a is pivoted and displaced around the support tube 35 toward the bottom in FIG. 7. Then, in this state, the front-end section of the steering column 6a (front-end sections of the side plate sections 30) is inserted into the slits 37 through openings on the bottom ends of these slits 37. After that, the housing 11a and the steering column 6a are pivoted and displaced around the support tube 35 toward the top in FIG. 7, and the middle section of the steering column 6a is inserted into the portion between the holding plate sections 20a, 20b. When insertion work is performed in this kind of order, with the insertion work of one completed, the phase in the rotational direction of the steering column 6a is in the proper phase, and this proper phase is maintained, so it becomes easy to perform the following insertion work. In this case as well, the two insertions described above can be performed in one process on an assembly line for the steering apparatus.

In either case, in this example, the work of inserting the front-end section of the steering column 6a (front-end sections of the side plate sections 30) into the slits 37 through the openings on the bottom ends of the slits 37 is performed in a state wherein the steering shaft 5a is not placed inside the steering column 6a, or is performed in a state wherein the front-end section of the steering shaft 5a that has been placed inside the steering column 6a is moved sufficiently out of the way toward the rear. In this way, the front-end section of the steering shaft 5a is prevented from hindering the insertion work.

Example 2

Figure 10:
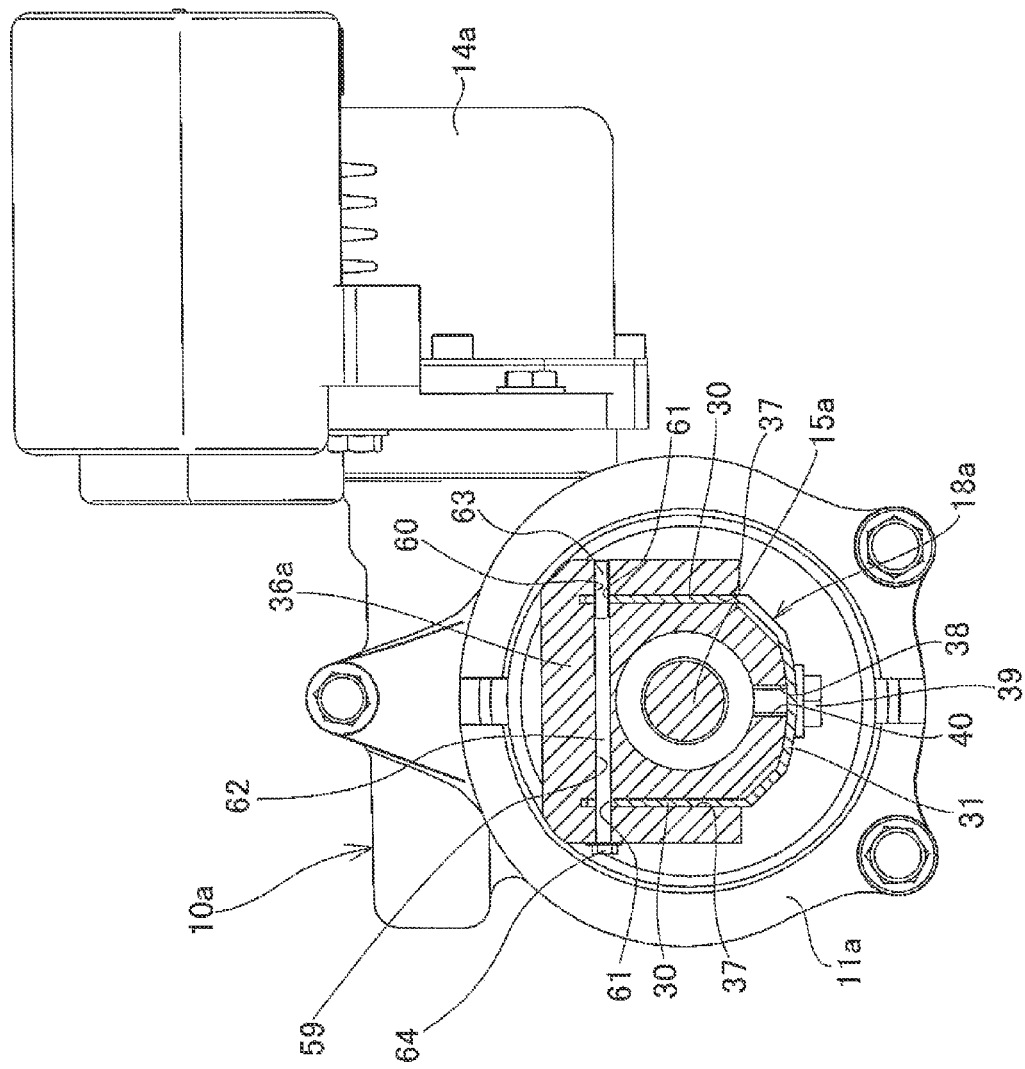
FIG. 10 is a drawing similar to FIG. 5 and illustrates a second example of an embodiment of the present invention.

A second example of an embodiment of the present invention will be explained using FIG. 10. In the case of the steering apparatus of this example, a screw hole 59 is formed as a through hole in the width direction (left-right direction in FIG. 10) in the portion near the top end of the connection and fastening section 36a that is formed in the center section of the rear-end surface of the housing 11a. A female screw section 60 is formed in just the port near one end in the width direction (near the right end in FIG. 10) of the inner circumferential surface of the screw hole 59, and the other portion is formed as simply a through hole. In the assembled state illustrated in FIG. 10, through holes 61 that pass in the width direction through the pair of side plate sections 30 of the outer column 18a at positions that are aligned with the screw hole 59 in the connection and fastening section 36a.

In this example as well, as in the first example of an embodiment of the present invention, the front-end sections of the side plate sections 30 of the outer column 18a are inserted inside the pair of slits 37 in the connection and fastening section 36a through openings in the bottom end of the slits 37. Moreover, in this state, the male screw section 63 of a bolt 62 that is passed through the screw hole 59 in the connection and fastening section 36a and the through holes 61 in the side plate sections 30 from one side in the width direction (left side in FIG. 10) to the other side (right side in FIG. 10) is screwed into the female screw section 60 in the connection and fastening section 36a and further tightened. In this way, between the head section 64 and the male screw section 63 of the bolt 62, the portion of the connection and fastening section 36a that is further on the outside in the width direction than the slits 37 is tightened so as to contract toward the inside in the width direction.

Additionally, in this example, construction can be applied wherein a fastening bolt 39 that is passed through a through hole 38 that is formed in the center section in the width direction of the front-end section of the bottom plate section 31 of the outer column 18a is screwed into a screw hole 40 that is formed in the center section in the width direction on the bottom surface of the connecting and fastening section 36a, and by further tightening, the connection and fastening section 36 is connected and fastened to the front-end section of the outer column 18a. Moreover, as in the first example of the embodiment, construction is applied as illustrated in FIG. 6 in order that the front-end sections of the side plate sections 30 can be inserted inside the slits 37. The construction and function of other parts are the same as those in the case of the first example of the embodiment.

In this example, the bolt 62 is tightened so that the portions of the connection and fastening member 36a that are further on the outside in the width direction than the slits are contracted toward the inside in the width direction (side of the side plate sections 30). Therefore, the surface pressure at the areas of contact between the inside surfaces of the slits 37 and the surfaces of both sides in the width direction of the side plate sections 30 increases, and thus it is possible to improve the rigidity of the connecting section between the outer column 18a and the connection and fastening member 36a. The bolt 62 connects and fastens the connecting and fastening section 36a and outer column 18a, so the side plate sections 30 of the outer column are effectively prevented from coming out from the slits 37 even when body of the operator collides with the steering wheel 1 (see FIG. 11) during a secondary collision and the entire steering apparatus rotates about the expansion and contraction mechanism 29 so that the front side rotates downward and the rear side rotates upward (counterclockwise direction in FIG. 3).

INDUSTRIAL APPLICABILITY

In the embodiment of the present invention described above, the present invention is applied to construction that comprises both a tilt mechanism for making it possible to adjust the up-down position of the steering wheel, and a telescopic mechanism for making it possible to adjust the forward-backward position of the steering wheel. However, the present invention can also be applied to construction that comprises only one of these mechanisms.

EXPLANATION OF REFERENCE NUMBERS

1 Steering wheel
2 Steering gear unit
3 Input shaft
4 Tie rod
5, 5a Steering shaft
6, 6a Steering column
7 Universal joint
8 Intermediate shaft
9 Universal joint
10, 10a Electric power steering apparatus
11, 11a Housing
12 Vehicle body
13 Horizontal shaft
14, 14a Electric motor
15, 15a Inner shaft
16, 16a Outer shaft 17, 17a Inner column
18, 18a Outer column
19, 19a Vehicle-side bracket
20, 20a, 20b Holding plate section
21, 21a Column-side bracket
22, 22a, 22b Long hole in the up-down direction
23, 23a Long hole in the forward-backward direction
24, 24a Adjustment rod
25, 25a Head section
26 Adjustment nut
27, 27a Adjustment lever
28 Energy absorbing member
29 Expansion and contraction mechanism
30 Side plate section
31 Bottom plate section
32 Retaining block
33 Bearing
34 Reduction gear
35 Support tube
36, 36a Connection and fastening section
37 Slit
38 Through hole
39 Fastening bolt
40 Screw hole
41 Protrusion
42 Top plate section
43 Installation plate section
44 Installation member
45 Cam device
46 Through hole
47 Thrust sliding bearing
48 Nut
49 Driving cam
50 Driven cam
51a, 51b Spacer
52 Radial sliding bearing
53 Pivot arm
54 Male gear
55 Female gear
56 Restoring spring
57 Bent raised section
58 Ridge
59 Screw hole
60 Female screw section
61 Through hole
62 Bolt
63 Male screw section
64 Head section

What is claimed is:

1. A steering apparatus for an automobile comprising:
a steering column that has a front-end section that is formed in a U shape that is open at the top and comprises a pair of left and right side plate sections that face each other and a bottom plate section that connects to the edges on the bottom ends of these side plate sections;
a housing for an electric power steering apparatus that is supported by the vehicle body and that has a connection and fastening section on the rear that is provided with a pair of left and right slits that have openings on the bottom end surface and the rear end surface that receive the side plate sections on the front-end section of the steering column;
a vehicle-side bracket that is supported by the vehicle body and that has a pair of holding plate sections that are located at positions on both the left and right sides of the middle section of the steering column, with the portion that exists between the bottom edges being of the holding plate sections being open; and
an expansion and contraction mechanism that comprises a rod shaped member that is inserted in the left-right direction through a through hole that is formed in positions of the holding plate sections that are aligned with each other, and a pair of pressing sections that are provided on both end sections of the rod shaped member, and by moving these pressure sections away from each other or close to each other in the axial direction of the rod shape member, the space between the holding plate sections is changed, and when this space is contracted, the expansion and contraction mechanism fastens the steering column to these holding plate sections;
with the side plate sections of the front-end section being inserted into the slits of the connection and fastening section, the front-end section and the connection and fastening section being connected and fastened together by a bolt.

2. The steering apparatus for an automobile according to claim 1, wherein protruding sections are formed on at least one side surface of the slits in the connection and fastening section and the side plate sections of the front-end section, and with the side plate sections of the front-end section being inserted into the slits of the connection and fastening section, the protruding sections come in elastic contact with the opposing surface that faces the one side surface.

3. The steering apparatus for an automobile according to claim 1, wherein a screw hole that is open on the bottom end surface is formed in a position of the connection and fastening section that is between the slits, a through hole is formed in a position of the bottom plate section of the front-end section that is aligned with the screw hole, and with the top surface of the bottom plate section of the front-end section in contact with the bottom end surface of the connection and fastening section, and with a bolt inserted through the through hole in the bottom plate section, the bolt is screwed into the screw hole.

4. The steering apparatus for an automobile according to claim 1, wherein a screw hole is formed so as to pass in the left-right direction through the portion near the top end of the connection and fastening section by way of the slits, through holes are formed in the side plate sections of the front-end section at positions that are aligned with the screw hole, and with the top surface of the bottom plate section of the front-end section in contact with the bottom end surface of the connection and fastening section, and with a bolt inserted through the through holes in the side plate sections, the bolt is screwed into the screw hole.

5. The steering apparatus for an automobile according to claim 1, wherein
the housing is supported by the vehicle body so as to be able to pivotally displace around a horizontal shaft that is arranged in the left-right direction;
through holes in the holding plate sections are long holes in the up-down direction that are arc shaped around the center of the horizontal shaft;
a through hole is formed in the middle section of the steering column at a position that is aligned with the long holes in the up-down direction;
the rod member is inserted through the long holes in the up-down direction of the housing and the through hole of the steering column; and
when the fastened state of the steering column being fastened to the holding plate sections is released by increasing the space between the holding plate sections by the expansion and contraction mechanism, the up-down position of the steering column can be adjusted within the range that the rod shaped member can displace in the long holes in the up-down direction.

6. The steering apparatus for an automobile according to claim 1 wherein the steering column comprises a front column that is located on the front side, and a rear column that is located on the rear side and assembled so as to be able to displace relative to the front column;

the front-end section is formed on the front column;

a through hole is formed in the rear section of the front column at a position that is aligned with through holes in the holding plate sections;

a long hole in the forward-backward direction that is long in the axial direction of the rear column is formed in the rear column at a position that is aligned with the through holes in the holding plate sections and the through hole in the front column;

the rod shaped member is inserted through the through holes in the holding plate sections, the through hole in the front column and the long hole in the forward-backward direction of the rear column, and when the fastened state between the rear column and the holding plate sections and front column is released by enlarging the space between the holding plate sections by the expansion and contraction mechanism, it is possible to adjust the forward-backward position of the rear column within a range that the rod shaped member can displace inside the long hole in the forward-backward direction.

7. The steering apparatus for an automobile according to claim 6, wherein the front column is an outer column, and this entire outer column is formed in a U shape that is open at the top with the side plate sections and the bottom plate section;

the rear column is an inner column and is such that the front section of this inner column fits inside the rear section of the outer column;

the expansion and contraction mechanism expands or contracts the inner dimension of the rear section of the outer column by changing the space between the holding plate sections, such that when the inner dimension is contracted, displacement in the axial direction of the inner column with respect to the outer column is suppressed, and when the inner dimension is expanded, displacement in the axial direction of the inner column with respect to the outer column is possible.

* * * * *